Aug. 15, 1967  L. J. HECK ET AL  3,336,080
VEHICULAR DUMPING MECHANISM
Filed May 21, 1965  4 Sheets-Sheet 1
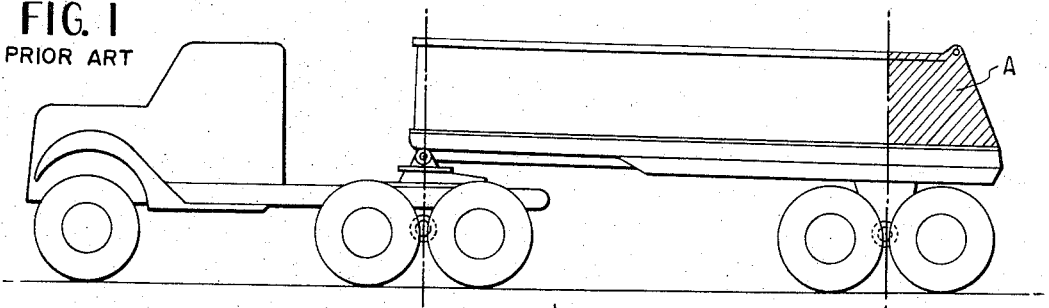
FIG. 1
PRIOR ART
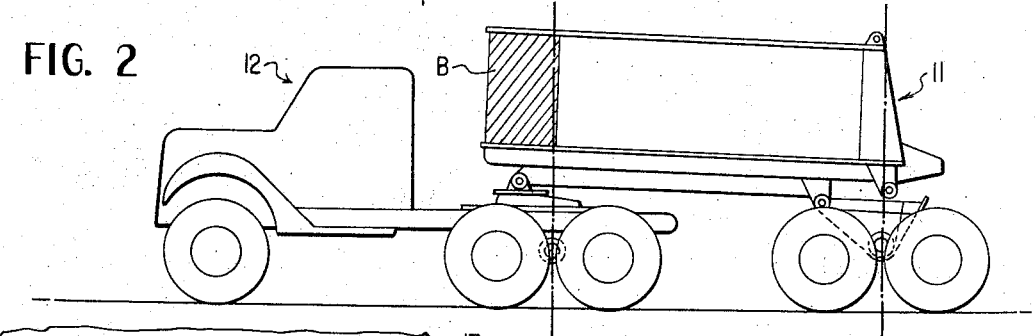
FIG. 2
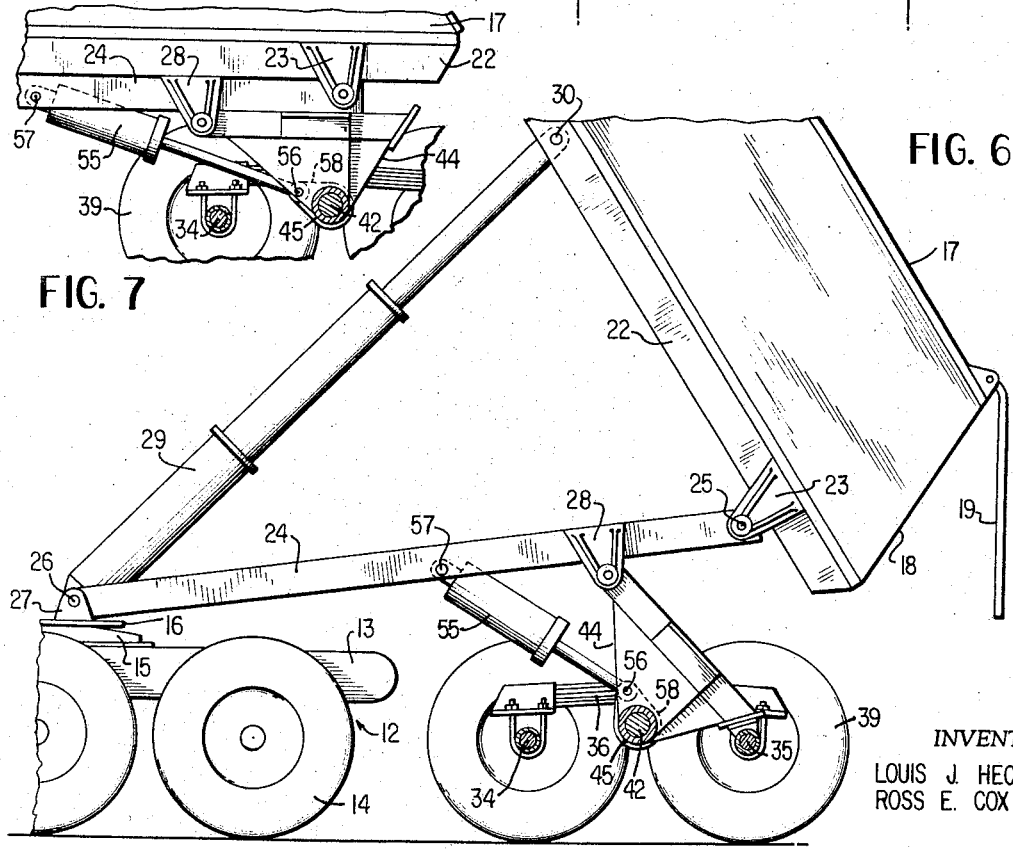
FIG. 6
FIG. 7
INVENTORS
LOUIS J. HECK
ROSS E. COX
BY Irons, Birch, Swindler & McKee
ATTORNEYS.

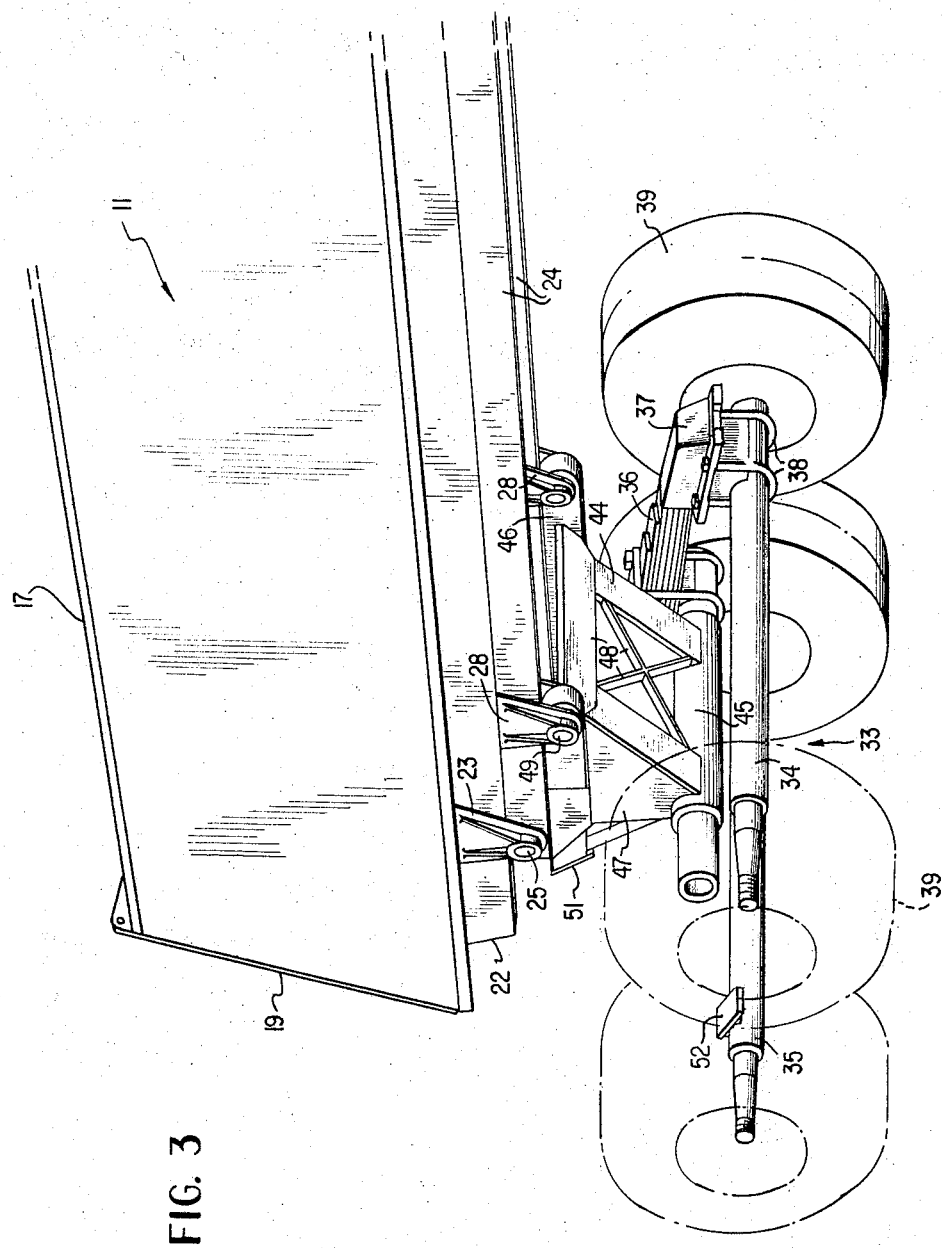

INVENTORS
LOUIS J. HECK
ROSS E. COX

INVENTORS.
LOUIS J. HECK
ROSS E. COX

BY

ATTORNEYS.

United States Patent Office 3,336,080
Patented Aug. 15, 1967

3,336,080
VEHICULAR DUMPING MECHANISM
Louis J. Heck and Ross E. Cox, Baton Rouge, La.
Filed May 21, 1965, Ser. No. 457,613
18 Claims. (Cl. 298—17.5)

This invention relates to dump vehicles such as semi-trailers, trucks and other roadway vehicles, and more particularly, to an improved dump mechanism for vehicles of the aforementioned type in which the rear end of the vehicle is supported upon an undercarriage, such as a tandem rear axle wheel and spring assembly.

Dump vehicles are commonly used in transporting many different materials, such as sand, gravel, grain products, coal, cement and other similar materials in bulk. Many of these materials are loaded into open dump bodies, while others such as cement, are loaded into tank-type bodies, which must be tilted to a relatively high inclined dumping angle in order to facilitate the removal of all of the material from the dump body.

Most heretofore known dump vehicles have been constructed so that the front portion of the dump body moved away from the ground and the discharge outlet at the rear of the body moved toward the ground as the body was tilted vertically to effect dumping. The lowering of the discharge outlet at the rear of the body has often made it difficult to effect a complete emptying of the dump body into a bin, container or other receptacle. In those types of dump vehicles where the dump body overhangs the rear wheel of the vehicle, the wheels often come in contact with the rear end of the dump body as it is tilted, thus limiting to a significant extent, the maximum degree of tilt of the dump body. Moreover, such dump vehicles having the dump body overhanging the rear wheels do not achieve an effective distribution of the weight to all of the wheels of the vehicle. This is due to the fact that the weight of the overhanging portion of the dump body in back of the pivot point acts to counterbalance the weight in front of the pivot point. Accordingly, the amount of weight which may be carried by the front wheels of the dump vehicle is significantly limited.

A further problem encountered with heretofore known dump vehicels of the semi-trailer type employing tandem rear axle wheel assemblies has been that the front wheels of the assembly raise off the ground as the dump body is tilted to dump position, thus causing the trailer to be highly unstable during the dumping operation.

Other prior art dumping vehicles have been beset by the problem of distributing the load between all of the wheels of the tandem rear axle wheel assembly both when the dump body of the vehicle is in its normal, substantially horizontal load-carrying position and when it is in its inclined dumping position.

While many of the heretofore known dump vehicles have been afforded some degree of success, such vehicles have not proven entirely satisfactory in overcoming all of the problems mentioned above. For example, in those prior art devices in which the load is distributed on all the wheels of the tandem rear axle wheel assembly, both while the dump body is in its normal load-carrying horizontal position and in its dumping position, no adequate means has been provided for eliminating interference between the back wheels and the discharge or rear end portion of the dump body while the body is raised in dumping position so that it may achieve a maximum degree of tilt. Conversely, in those prior art dump vehicles in which interference between the rear end portion of the dump body of the rear wheels has been substantially eliminated, no provisions have been made for distributing the weight among all of the wheels of the tandem rear wheel axle assembly as well as the front wheels of the vehicle.

To overcome the disadvantages of the prior art dump vehicles, it is an object of this invention to provide an improved vehicular dumping mechanism which permits the dump body to be raised to its maximum degree of tilt without interference with the rear wheels of the vehicle while at the same time distributing the load between all of the wheels of the tandem rear axle wheel assembly.

Another object of the invention is to provide such a vehicular dumping mechanism which maintains the elevation of the discharge outlet at the rear end of the vehicular dump body while the body is tilted to its maximum dumping position.

A further object of the invention is to provide an improved vehicular dumping mechanism which permits the load carried by a dump vehicle to be distributed among all of the wheels of the vehicle including the front wheels as well as the wheels of the tandem rear axle assembly while the dump body is in its normal horizontal load-carrying position and which also permits an improved load distribution among all of the wheels of the tandem rear axle wheel assembly while the dump body is tilted to an inclined dumping position.

A still further object of the invention is to provide an improved dump vehicle having a high discharge outlet so that material contained in the dump body may be unloaded easily therefrom.

Another object of the invention is to provide a tandem axle dump vehicle having front and back rear wheels which remain on the ground at all times during dumping to provide a maximum degree of stability.

Still another object of the invention is to provide a dump vehicle having a dump body which may be locked in position when the body is in its normal horizontal load-carrying position.

A further object of the invention is to provide an improved vehicular dumping mechanism of simple and inexpensive construction having a high degree of dumping efficiency.

Broadly, the invention embraces a dump vehicle comprising a dump body having a discharge outlet at its rear end, a frame member pivotally connected at a first pivot point at its rear end to the rear portion of said body, a tandem rear axle assembly, a subframe support member pivotally connected at a second pivot pivot point to said frame member and at a third pivot point to said assembly, means for tilting said body about said first pivot point from a substantially horizontal load-carrying position to an inclined dumping position and means connected to said support member for pivoting said support member about said third pivot point whereby the elevation of said outlet is substantially precluded from being lowered and all of the wheels of said assembly support the load of said body while simultaneously causing relative shifting movement between said body and said axle assembly when said body is tilted to dumping position, said relative shifting of said body being rearward.

The invention having been broadly described, certain specific embodiments will now be set forth in detail with reference to the accompanying drawings in which:

FIGURE 1 is a side elevation view of a conventional prior art tractor and dump trailer combination with the portion of the body of the trailer in back of the body pivot point being indicated by the shaded area;

FIGURE 2 is a side elevation view of a tractor and dump trailer combination embodying the present invention with the portion of the body of the trailer which is ahead of the center of the rear wheel assembly of the towing vehicle being indicated by the shaded area;

FIGURE 3 is an isometric view of the rear portion of a dump vehicle illustrating an improved dumping mechanism constructed according to the principles of the present invention;

FIGURE 6 is a side elevation view of a portion of a dump trailer embodying a modified form of a dumping mechanism according to the invention;

FIGURE 7 is a side elevation view of a portion of the dump trailer of FIGURE 6 showing the dump body in a substantially horizontal load-carrying position;

Figure 4:
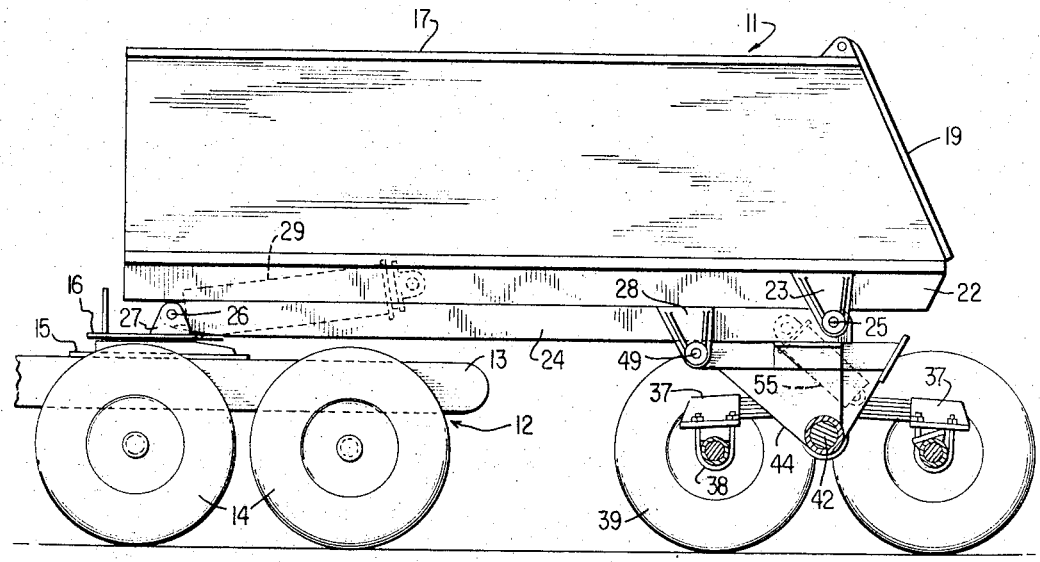
FIGURE 4 is a side elevation view of a dump trailer embodying the dumping mechanism of the present invention showing a dump body in a substantially horizontal load-carrying position.

Referring more particularly to the drawings wherein like parts are identified by the same numerals throughout the several views, the numeral 11 broadly indicates a dump trailer constructed according to the principles of the invention. Although the dumping mechanism of the invention is shown embodied in a dump semi-trailer construction, it will be clearly understood that the principles and advantages of the invention are in nowise limited thereto but may be utilized in connection with any other suitable dump vehicle such as a dump truck.

The semi-trailer 11 may be coupled to any suitable towing vehicle, indicated generally by the reference numeral 12. The towing vehicle 12 may be of any conventional construction and includes a metal frame 13 supported by wheels 14 and having a fifth wheel connection 15 mounted on the rear portion thereof to provide a connection between the towing vehicle and the trailer. The trailer 11 is provided with an upper fifth wheel or turnplate 16 for connection to the fifth wheel 15 of the towing vehicle in a conventional manner.

The trailer body 17 may be of any conventional type such as the open topped construction shown in the drawings. It will be understood however, that the invention is not limited for use only with an open topped body construction by may be employed with other types of trailer bodies such as closed or tank-type bodies which are suitable for dumping. The dump body 17 is provided with a discharge outlet 18 at its rear end thereof which is closed by a conventional type swinging tailgate 19. The trailer body 17 is supported underneath by a pair of longitudinal side rails or beams 22 extending the length of the body. Each of the side rails 22 is provided adjacent its rear end thereof with a bracket member 23 having a hinge pin receiving opening in its bottom portion thereof.

The trailer also includes a pair of longitudinal frame members 24 pivotally connected at a first pivot point at their rear ends to the brackets 23 attached to the side rails 22 of the trailer body 17. Hinge pins 25 are inserted through each of the brackets 23 and each of the frame members 24 to form the pivotal connection. The front ends of frame members 24 are pivotally attached to a hinge pin or rod 26 mounted between a pair of upstanding brackets 27 rigidly attached to the fifth wheel turnplae 16. Mounted on each of the frame members 24 near the rear end portion thereof is a depending bracket member 28 having a hinge pin receiving opening in the bottom portion thereof.

Power for elevating or tilting the body 17 to its inclined dumping position may be furnished by any suitable means such as a telescopic, hydraulically actuated hoist cylinder 29 comprised of a series of cylindrical sections slidably disposed one within the other and provided with suitable hydraulic seals. The cylinder 29 is pivotally connected at its front end to hinge pin 26 and at its rear end to a pin or other cylindrical rod member 30 extending between and rigidly secured to the side rails 22 of the body 17. Although the drawings disclose only one hoist cylinder attached to the middle portion of the body 17, it will be understood that a plurality of such cylinders may be employed if desired.

The trailer 11 is provided at its rear end with a tandem rear axle wheel assembly indicated generally by the numeral 33 and is comprised of a front axle 34 and a back axle 35 connected at each of their ends by a pair of leaf spring constructions 36. The opposite ends of each of the spring constructions 36 are confined in shackle members 37 attached to the axles 34 and 35 by means of U-bolts 38. Wheels 39 are mounted on the ends of each of the axles 34 and 35 of the rear axle wheel assembly 33.

A trunnion shaft 42 is mounted midway between axles 34 and 35 on the springs 36 by means of U-bolts 43 attached to each of the springs and the ends of the trunnion. Pivotally attached to the trunnion 42 is a generally V-shaped subframe support member indicated by the numeral 44. Subframe support member 44 is generally comprised of a tubular trunnion receiving member 45 at its lower portion thereof and a pair of spaced longitudinal beam members 46 on its upper portion thereof connected by suitable side plates 47 and bracing members 48 as best illustrated in FIGURE 3. The front end portion of each of the beams 46 is provided with a hinge pin receiving opening to form a pivotal connection at a second pivot point with each of the bracket members 28 by means of hinge pins 49.

Stop pads 51 are provided on the extreme back end of each of the beam members 46 for cooperation with corresponding stop pads 52 mounted adjacent each end of the back axle 35. The stop pads 51 and 52 provide means for limiting the maximum degree of tilt of the body while at the same time furnishing support for a portion of the weight of the body when it is tilted to its maximum degree of tilt.

Figure 10:
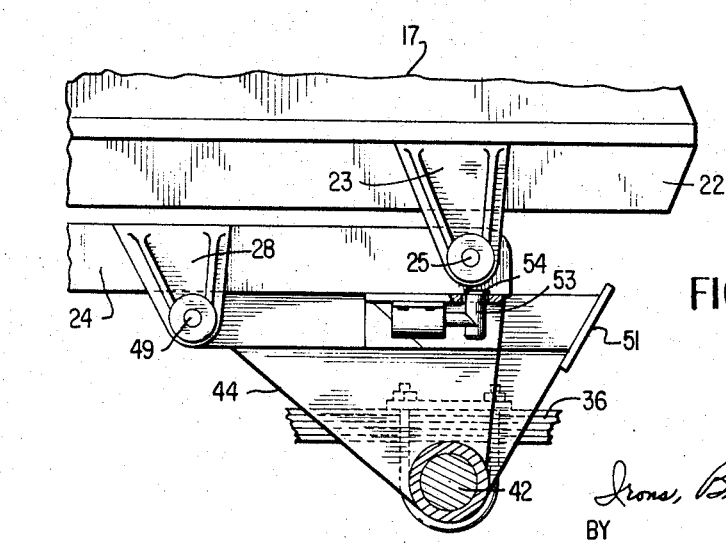
FIGURE 10 is an enlarged side elevation view of a portion of the dumping mechanism of the present invention illustrating the locking means for locking the dump body in its normally horizontal load-carrying position.

Suitable locking means may be provided according to the present invention for the purpose of securing the trailer body in its normal horizontal load-carrying position. As best illustrated in FIGURE 10 of the drawings, a suitable locking mechanism may comprise automatic locking pins 53 mounted at each upper side of subframe support member 44. The locking pins 53, which may be operated either manually through means such as a trip mechanism, or automatically through means such as a solenoid, are normally biased upwardly for locking engagement with pin receiving recesses 54 in the rear end portions of the frame members 24. When the locking pins are engaged in the recesses 54, the dump mechanism is locked against tilting. To release the locking pins, it is only necessary to actuate them either manually or automatically, depending on which type of mechanism is used, to withdraw the locking pins from the recesses. Correspondingly, whenever the dumping mechanism is returned to its normal horizontal position, the locking pins automatically move into lock enagement with the recesses to lock the mechanism against tilting.

Figure 5:
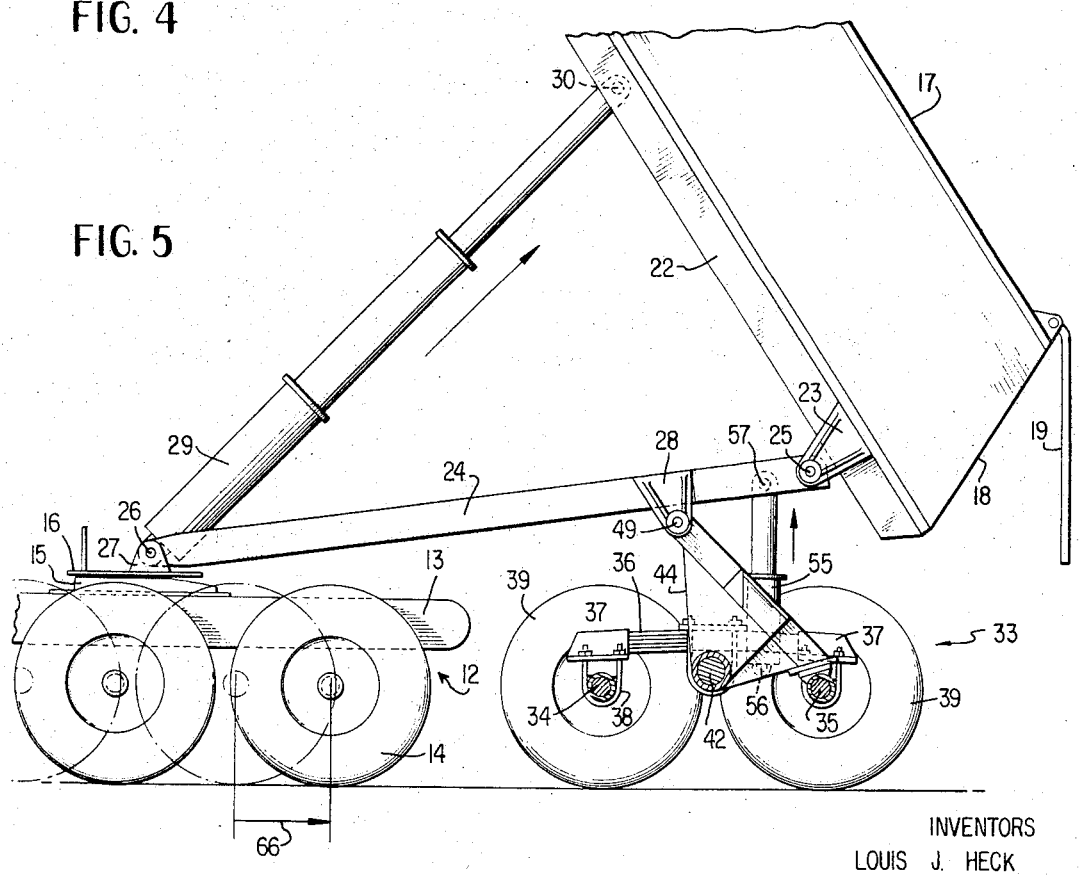
FIGURE 5 is a side elevation view of the dump trailer of FIGURE 4 showing the dump body tilted to a dumping position.

An important feature of the present invention is the provision of means connected to subframe support member 24 for pivoting the support member about the trunnion 42. In the embodiment of the invention shown in FIGURES 3 through 5, this means may comprise a hydraulically actuated telescopic hoist cylinder 55 pivotally connected at its rear end to support member 44 by any suitable means such as rod 56 extending between side plates 47 at a point near the rear end of the support member midway between tubular member 45 and the rear upper ends of beam members 46. Correspondingly the upper end of hoist cylinder 55 is pivotally connected to a pin or rod 57 extending between frame members 24 and attached thereto. The rod 57 is attached to frame members 24 adjacent the ends thereof midway between the brackets 28 and hinge pins 25. While the drawings only illustrate one hoist cylinder being used, it will be understood that a plurality of hoist cylinders may be employed if desired.

Illustrated in FIGURES 6 and 7 of the drawings is a modified form of the invention showing the hoist cylinder 55 mounted in an alternate position. As shown in FIGURES 6 and 7, telescopic hoist cylinder 55 may be pivotally connected at its rear end to support member 44 by any suitable means such as a rod 56 extending between a pair of brackets 58 mounted adjacent the ends of tubular member 45 between side plates 47. The upper end of hoist cylinder 55 may be pivotally connected to a rod 57 extending between frame member 24 and attached thereto at a point between brackets 27 and 28. The alternate positioning of hoist cylinder 55 is advantageous in that it permits easier access to the cylinder for servicing.

Figure 8:
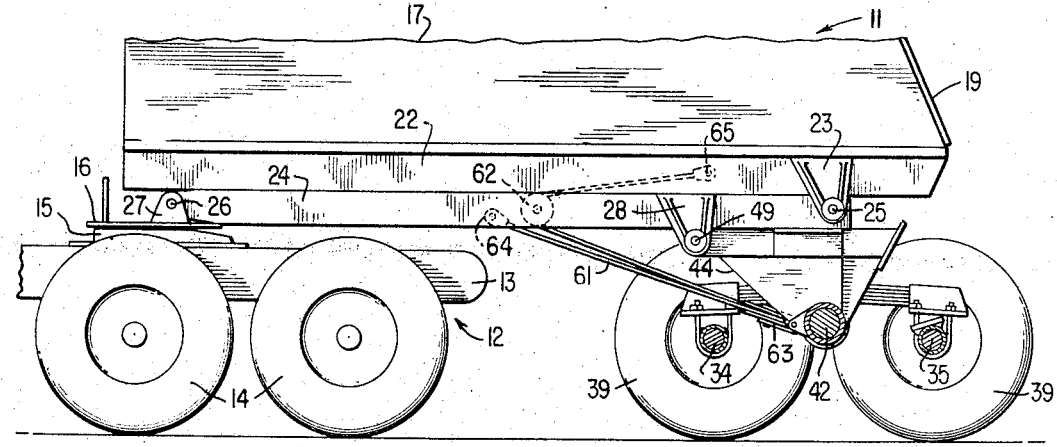
FIGURE 8 is a side elevation view of a dump trailer embodying another modified form of dumping mechanism according to the invention.
Figure 9:
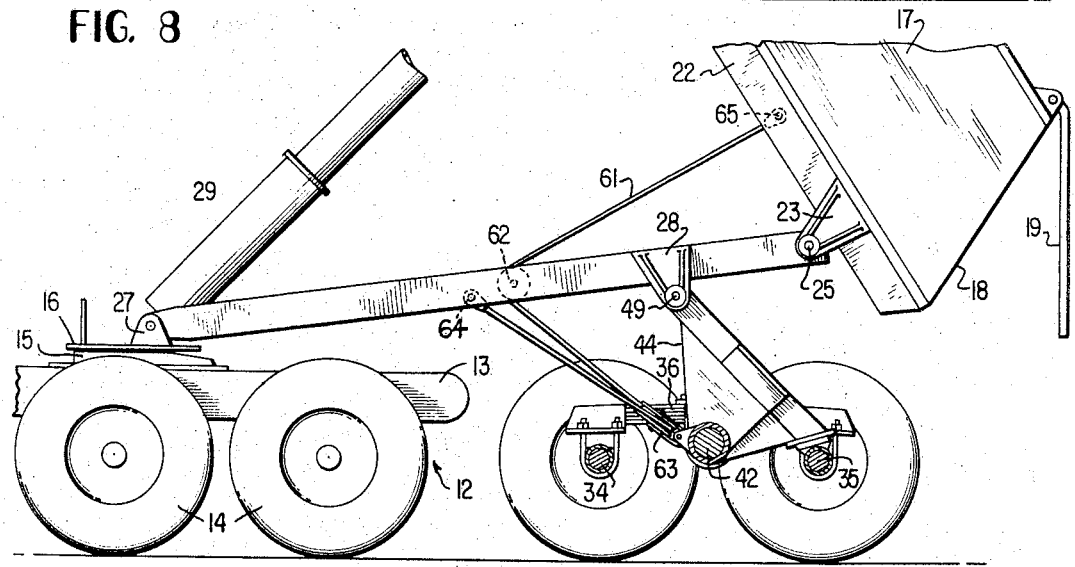
FIGURE 9 is a side elevation view of the dump trailer of FIGURE 8 showing the dump body tilted to a dumping position.

In the embodiment of the invention shown in FIGURES 8 and 9, the means connected to the support member 44 for pivoting the member about the trunnion 42, comprises a flexible means such as a cable 61. When the cable arrangement is employed, it is necessary to provide a pulley 62 mounted on a rod extending between the frame members 24 and attached thereto at a point in front of bracket members 28 approximately midway of the frame members. In addition, another pulley preferably is attached to tubular member 45 of support member 44 midway of the tubular member. As best shown in FIGURE 9, the cable 61 is attached at one end to the frame members 24 by any suitable means such as pin 64 at a point in front of pulley 62. The other end of cable 61 is operatively connected to side rails 22 of body 17 by any suitable means such as pin 65. Cable 61 thus is attached at one end to the side rails 22, extends around pulleys 62 and 63 and is attached at its other end to frame members 24. If desired, pulley 63 may be eliminated and the end of cable 61 attached directly to the tubular member 45 of support member 44. Moreover, while only one cable is illustrated in the drawings, it will be understood that a plurality of cables may be employed and connected in the same manner as shown for cable 61.

In operation of the dumping mechanism of the invention, the locking pins 53 are released and the body is raised by the actuation of hoist cylinder 29. Simultaneously therewith, in the embodiment shown in FIGURES 3 through 7, hoist cylinder 55 is actuated to pivot subframe support member 44 rearwardly about trunnion 42 until the stop pads 51 and 52 come into contact with each other at the maximum degree of tilt of the body. As support member 44 is pivoted rearwardly and the body 17 is tilted, frame members 24 correspondingly are moved upwardly, thus raising the elevation of the pivot point at hinge pins 25 where the body 17 is hinged to frame members 24. Normally, as the body 17 is tilted, the discharge outlet 18 would be lowered. With the present invention, however, by means of the pivot connection between the support member 44 and frame members 24, the rear portions of frame members 24 are correspondingly raised to compensate for any lowering of the discharge outlet which otherwise might occur with the tilting of body 17 to a dumping position. Thus, an effective means is provided for maintaining the elevation of the discharge outlet of the body at all times during dumping in that the discharge outlet is substantially precluded from being lowered.

Simultaneously with the raising of the elevation of the rear end portion of frame members 24, the pivotal movement of support member 44 causes a relative longitudinal shifting movement between the body 17 and the rear axle wheel assembly 33 in the direction of the length of the trailer or vehicle when the body is tilted to dumping position. This relative shifting movement between the body and the rear axle wheel assembly may be accomplished in either one or two ways. Either the brakes of the rear axle wheel assembly may be locked to preclude the assembly from movement so that the towing vehicle would then be shifted rearwardly along with the body 17 simultaneously with the raising of the body, as shown by the dotted lines and the arrow in FIGURE 5, or the brakes of the towing vehicle may be locked to hold the body 17 from shifting while the brakes of the rear axle wheel assembly are released to permit the assembly to shift forwardly with respect to the body as the body is tilted to dumping position.

The relative longitudinal shifting movement between the trailer body and the rear axle wheel assembly is a significant advantage of the present invention in that it provides a convenient means of permitting the body to dump clear of the rear wheels without interference therefrom. Moreover, this shifting movement, along with the upward movement of the rearward portions of frame members 24, permits the body 17 to be tilted to a maximum degree of tilt in order to provide an effective and efficient dumping action.

A further advantage of the dumping mechanism of the present invention resides in the manner in which the weight of the load carried by the dump body is distributed among all of the wheels of the vehicle while the dump body is in its normal substantially horizontal load-carrying position. In the case where the dumping mechanism of the present invention is employed on the dump trailer of a tractor-trailer combination, the load is distributed among the wheels of the tractor or other towing vehicle as well as the trailer, as illustrated in FIGURE 2 of the drawings.

Illustrated in FIGURE 1 of the drawings is a conventional prior art tractor-dump trailer combination in which a significant portion of the dump body of the trailer is positioned behind or in back of the pivot point of the dump body, as indicated by shaded portion A. In such a conventional type dump trailer, it is necessary to extend the dump body far enough in back of the pivot point so that the end of the dump body will clear the wheels of the rear axle assembly when the body is dumped. The disadvantage of having a substantial portion of the dump body in back of the pivot point as shown in FIGURE 1 is that the weight of the load in that portion of the body acts to counterbalance the weight in front of the pivot point, thus limiting to a significant extent the amount of the weight of the load which may be carried by the wheels of the tractor or towing vehicle.

As shown in FIGURE 2 of the drawings, the dumping mechanism of the present invention enables the dump trailer to be constructed so that substantially all of the dump body is located ahead or in front of the pivot point of the rear axle wheel assembly when the body is in a substantially horizontal load-carrying position. No substantial portion of the load carried by the dump body is located in back of the pivot point of the rear axle wheel assembly acting to counterbalance the weight in front of the pivot point. Therefore, a greater portion of the load, as indicated by shaded area B in FIGURE 2, may be carried or supported by the wheels of the towing vehicle.

It is also to be noted that, for the reasons just mentioned, the dumping mechanism of the present invention permits the construction of a deeper and, consequently, shorter length dump body.

Another advantage of the dumping mechanism of the present invention resides in the manner in which the weight of the load carried by the dumping body is distributed between all of the wheels of the rear axle assembly, both while the body is in its normal substantially horizontal load-carrying position and when it is in its dumping position. This advantage accrues by reason of the fact that the load of the body is primarily supported on trunnion 42 which is located midway between the front and back axles on springs 36 of the rear axle wheel assembly 33.

It is further to be noted that the dumping mechanism of the invention permits all of the wheels of the rear axle wheel assembly to remain in contact with the ground during dumping, thus insuring that the load is distributed among all the wheels of the rear axle wheel assembly at all times as well as maintaining greater stability of the trailer.

The operation of the embodiment of the invention shown in FIGURES 8 and 9 is similar to the operation of the embodiment shown in FIGURES 3 through 7, except that flexible means such as cable 61 are employed to cause pivotal movement of support member 44 as the body 17 is tilted to dumping position. In operation of the embodiment shown in FIGURES 8 and 9, as the body 17 is tilted by the actuation of hoist cylinder 29, the body creates a pulling force on cable 61, which pulling force in turn is transmitted to the bottom portion of support member 44 causing the support member to pivot around trunnion 42. The pivotal movement of support member 44 creates the same effect with respect to the rest of the dumping mechanism and trailer as that described in connection with the embodiment shown in FIGURES 3 through 7.

It is apparent that the present invention contains several advantages which permit greater ease in dumping by reason of the fact that the elevation of the discharge outlet is not substantially lowered during dumping, and the relative longitudinal shifting movement between the body and the rear axle wheel assembly enables the body to be raised to a maximum degree of tilt without any interference with the rear wheels of the dumping vehicle. In addition, the load is distributed over all the wheels of the dump vehicle, both while the body is in its normal substantially horizontal load-carrying position and while it is in a dumping position. Moreover, greater stability and mobility of the dumping unit is maintained due to the fact that all of the wheels of the rear axle wheel assembly remain in contact with the ground during dumping.

While the invention has been described with particular reference to specific embodiments, many other modifications may be made by persons skilled in the art without departing from the scope of the invention which is defined solely by the appended claims.

What is claimed is:

1. A dump vehicle comprising
   a dump body having a discharge outlet at its rear end,
   a frame member pivotally connected at a first pivot point at its rear end to the rear portion of said body,
   a tandem rear axle wheel assembly,
   a subframe support member having a first portion pivotally connected at a second pivot point to said frame member and a second portion pivotally connected at a third pivot point to said assembly, said second pivot point being forward of said third pivot point,
   means operatively connected to said body for tilting said body about said first pivot point from a substantially horizontal load carrying position to an inclined dumping position,
   and means connected to said support member for pivoting the first portion of said support member upwardly and rearwardly relative to said third pivot point to elevate the rearward end of said frame member to substantially preclude lowering of said outlet and allowing all of the wheels of said assembly to support the load of said body while simultaneously causing relative shifting movement between said body and said axle assembly when said body is tilted to dumping position, said relative shifting of said body being rearward.

2. A dump vehicle comprising
   a dump body having a discharge outlet at its rear end,
   a frame member pivotally connected at a first pivot point at its rear end to the rear portion of said body,
   a rear axle wheel assembly including front and back axles connected by spring means,
   a trunnion mounted on said springs between said axles,
   a subframe support member having a lower portion and front and back upper end portions, said support member being pivotally mounted at its lower portion on said trunnion for pivotal movement thereabout and pivotally connected at a second pivot point at its front upper end portion to said frame member,
   means operatively connected to said body for tilting said body about said first pivot point from a substantially horizontal load-carrying position to an inclined dumping position,
   and means operatively connected to said support member for pivoting said support member about said trunnion whereby the elevation of said outlet is substantially precluded from being lowered and all of the wheels of said assembly support the load of said body while simultaneously causing relative shifting movement between said body and said axle assembly when said body is tilted to dumping position, said relative shifting of said body being rearward.

3. A dump vehicle as defined in claim 2 wherein said means for pivoting said support member comprises a hydraulically actuated cylinder means connected at one end to said frame member and at its opposite end to said support member.

4. A dump vehicle as defined in claim 2 wherein said means for pivoting said support member comprises a pulley mounted on said frame member, and flexible means connected at one end to said support member and passing around said pulley and having its other end connected to said body whereby tilting of said body will simultaneously cause pivotal movement of said support member about said trunnion.

5. A dump vehicle as defined in claim 2 which includes locking means on said support member to lock said body in a substantially horizontal load-carrying position.

6. A dump vehicle as defined in claim 2 which includes cooperating stop means mounted on said back axle and on said back upper end portion of said support member for limiting the maximum degree of tilt of said body.

7. A dump trailer for use in combination with a towing vehicle comprising
   a fifth wheel turnplate for connection to the towing vehicle,
   a dump body having a discharge outlet at its rear end,
   a frame member pivotally connected at a first pivot point at its rear end to the rear portion of said body and at its front end to said turnplate,
   a tandem rear axle wheel assembly,
   a subframe support member having a first portion pivotally connected at a second pivot point to said frame member and a second portion pivotally connected at a third pivot point to said assembly, said second pivot point being forward of said third pivot point, lifting means connected at one end to said turnplate and at its other end to said body for tilting said body about said first pivot point from a substantially horizontal load-carrying position to an inclined dumping position, and means connected to said support member for pivoting the forward portion of said support member upwardly and rearwardly relative to said third pivot point to elevate the rearward end of said frame whereby the elevation of said outlet is substantially precluded from being lowered and all of the wheels of said assembly support the load of said body while simultaneously causing relative shifting movement between said body and said axle assembly when said body is tilted to dumping position, said relative shifting of said body being rearward.

8. A dump trailer as defined in claim 7 wherein substantially all of said body is positioned forwardly of said third pivot point when said body is in a substantially horizontal load-carrying position whereby a substantial portion of the load of said body is supported by the towing vehicle.

9. A dump trailer for use in combination with a towing vehicle comprising a fifth wheel turnplate for connection to the towing vehicle, a dump body having a discharge outlet at its rear end, a frame member pivotally connected at a first pivot point at its rear end to the rear portion of said body and at its front end to said turnplate, a rear axle wheel assembly including front and back axles connected by spring means, a trunnion mounted on said springs between said axles, a subframe support member having a lower portion and front and back upper end portions, said support member being pivotally mounted at its lower portion on said trunnion for pivotal movement thereabout and pivotally connected at a second pivot point at its front upper end portion to said frame member, hydraulically actuated lifting means connected at one end to said turnplate and at its other end to said body for tilting said body about said first pivot point from a substantially horizontal load-carrying position to an inclined dumping position, and means operatively connected to said support member for pivoting said support member about said trunnion whereby the elevation of said outlet is substantially precluded from being lowered and all of the wheels of said assembly support the load of said body while simultaneously causing relative shifting movement between said body and said axle assembly when said body is tilted to dumping position, said relative shifting of said body being rearward.

10. A dump vehicle comprising a dump body having a discharge outlet at its rear end, a frame member pivotally connected at a first pivot point at its rear end to the rear portion of said body, a rear axle wheel assembly including front and back axles connected by spring means, a trunnion mounted on said springs between said axles, a subframe support member having a lower portion and front and back upper end portions, said support member being pivotally mounted at its lower portion on said trunnion for pivotal movement thereabout and pivotally connected at a second pivot point at its front upper end portion to said frame member, means operatively connected to said body for tilting said body about said first pivot point from a substantially horizontal load-carrying position to an inclined dumping position, means operatively connected to said support member for pivoting said support member about said trunnion whereby the elevation of said outlet is substantially precluded from being lowered and all of the wheels of said assembly support the load of said body while simultaneously causing relative shifting movement between said body and said axle assembly when said body is tilted to dumping position, said relative shifting of said body being rearward, locking means on said support member to lock said body in a substantially horizontal load-carrying position, and cooperating stop means mounted on said back axle and on said back upper end portion of said support member for limiting the maximum degree of tilt of said body.

11. A dump vehicle as defined in claim 10 wherein said means for pivoting said support member comprises a hydraulically actuated cylinder means connected at one end to said frame member and at its opposite end to said support member.

12. A dump vehicle as defined in claim 10 wherein said means for pivoting said support member comprises a pulley mounted on said frame member, and flexible means connected at one end to said support member and passing around said pulley and having its other end connected to said body whereby tilting of said body will simultaneously cause pivotal movement of said support member about said trunnion.

13. A dump vehicle comprising:

a dump body having a discharge outlet at its rearward end portion, a frame member having a forward portion and a rearward portion, said rearward portion being pivotally connected by a pivot point to said dump body, said forward portion being adapted for pivotal connection to a portion of said vehicle.

means associated with said body for tilting said body about said pivot point between a substantially horizontal load carrying position and an inclined dumping position, vehicular supporting means including a rear axle wheel assembly, means connecting said vehicular supporting means and said frame member for effecting a relative horizontal and vertical movement therebetween elevating and rearwardly moving the rearward portion of said frame member relative to said axle wheel assembly from a load carrying position wherein the rearward end of said body substantially overlies or is forward of said axle assembly to a load dumping position wherein said rearward end portion of said body is positioned in a rearwardly spaced relation from said axle wheel assembly.

14. A dump vehicle as recited in claim 13 wherein said connecting means includes a support member having a first portion pivotally connected to said frame member at a second pivot point and a second portion pivotally connected to said vehicular frame means at a third pivot point, said second pivot point being positioned forwardly of said third pivot point when said body is in a load carrying position and means operatively connected to said support member for pivoting said first portion of said support member upwardly and rearwardly relative to said third pivot point when said dump body is tilted to said inclined dumping position.

15. A dump vehicle as recited in claim 14 wherein said means for pivoting said first portion of said support member comprises a hydraulically actuated cylinder means connected at one end to said frame member and at its opposite end to said support member.

16. A dump vehicle as recited in claim 14 wherein said means for pivoting said first portion of said support member comprises a pulley mounted on said frame member, and flexible means connected at one end to said support member and passing around said pulley and having its other end connected to said dump body whereby tilting of said dump body will simultaneously cause pivotal movement of said support member.

17. A dump vehicle as recited in claim 13 which includes locking means on said connecting means to lock said dump body in a substantially horizontal load-carrying position.

18. A dump vehicle as defined in claim 13 which includes cooperating stop means mounted on said back axle assembly and said connecting means for limiting the maximum degree of tilt of said dump body.

References Cited

UNITED STATES PATENTS

| | | |
|---|---|---|
| 2,391,948 | 1/1946 | Couse. |
| 2,777,529 | 1/1957 | Harbers. |
| 2,853,341 | 9/1958 | Morse _____ 298—20 |
| 2,883,237 | 4/1959 | Schonrock _____ 298—17 |
| 3,055,710 | 9/1962 | Black _____ 298—22 X |

BENJAMIN HERSH, *Primary Examiner.*

RICHARD J. JOHNSON, *Examiner.*